United States Patent [19]

Isayev et al.

[11] Patent Number: 5,032,433
[45] Date of Patent: Jul. 16, 1991

[54] THERMOPLASTIC WEB AND PROCESS FOR MANUFACTURE SAME

[75] Inventors: Avraam I. Isayev; Pazampalaco R. Subramanian, both of Akron, Ohio

[73] Assignee: The University of Akron, Akron, Ohio

[21] Appl. No.: 392,202

[22] Filed: Aug. 10, 1989

[51] Int. Cl.$^5$ .............................................. B32B 3/10
[52] U.S. Cl. ........................................ 428/1; 428/131; 428/255
[58] Field of Search ............................ 428/1, 131, 255

[56] References Cited

U.S. PATENT DOCUMENTS

| | | | |
|---|---|---|---|
| 3,386,876 | 6/1968 | Wyckoff | 428/255 |
| 4,728,698 | 3/1988 | Isayev et al. | 525/177 |
| 4,835,047 | 5/1989 | Isayev et al. | 428/294 |

Primary Examiner—Alexander S. Thomas
Attorney, Agent, or Firm—Oldham & Oldham Co.

[57] ABSTRACT

An open work web of a polymer blend of a thermoplastic base or matrix polymer and a thermotropic liquid crystal polymer (LCP) is formed by preparing a melt blend of the base polymer and a liquid crystal polymer, continuously extruding a continuous web of said blend under melt conditions, allowing the web to cool as it passes over a succession of rolls including a pair of knit rolls which are driven at a speed faster than the speed at which the web is formed, so that the web is stretched or drawn and converted from a continuous web into an open work web comprising polymer blend fibers with interstices between the fibers. It is believed that these polymer blend fibers comprise microscopic fibers of the LCP in a matrix of the base polymer.

10 Claims, 2 Drawing Sheets

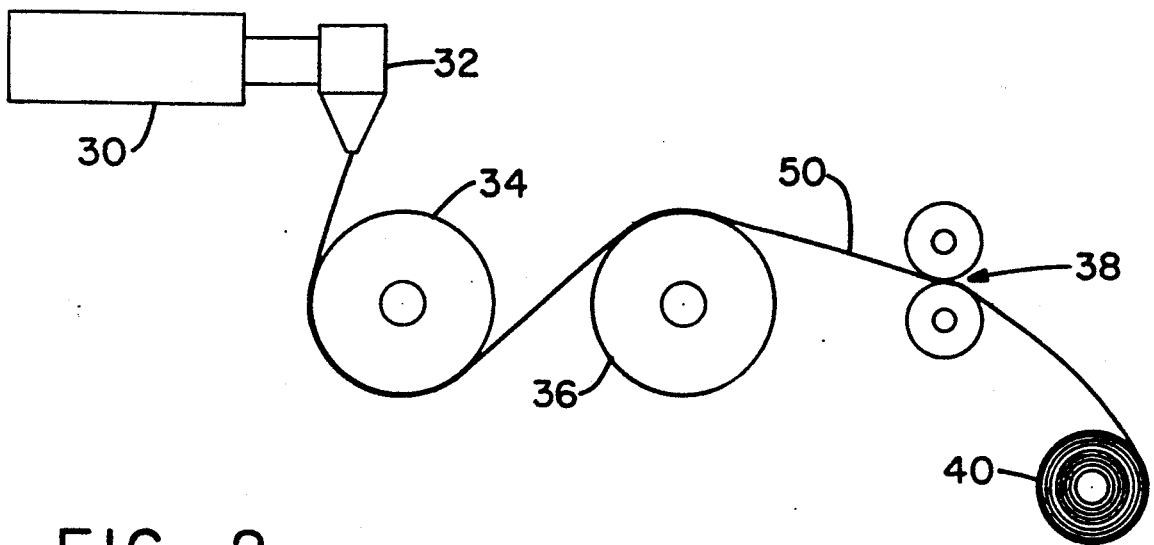
FIG.-2
FIG.-3
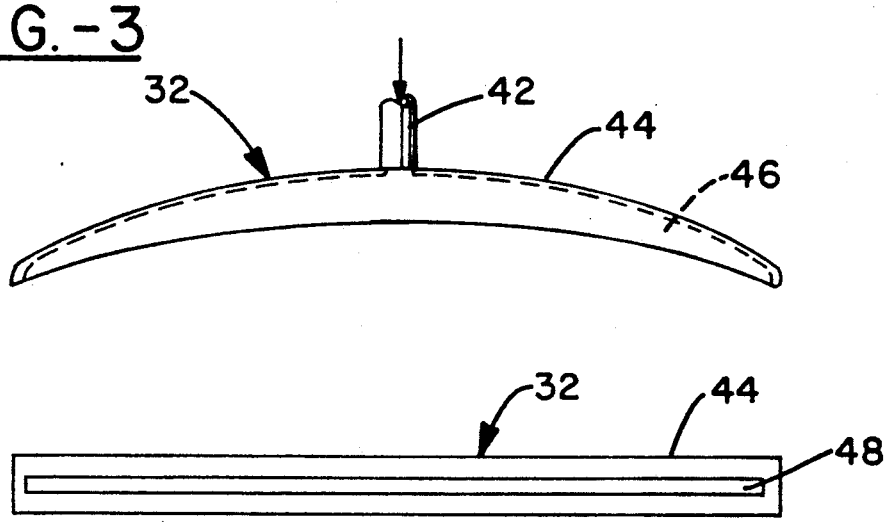
FIG.-3A
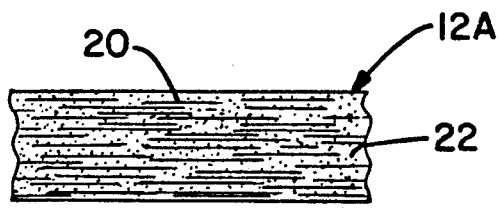
FIG.-4

THERMOPLASTIC WEB AND PROCESS FOR MANUFACTURE SAME

TECHNICAL FIELD

This invention relates to reinforced thermoplastic webs. More specially, this invention relates to open work webs of a reinforced thermoplastic material containing microscopic fibers formed in situ and to processes for producing the same.

BACKGROUND ART

Open work thermoplastic webs are known in the art. U.S. Pat. Nos. 3,386,876 and 3,539,666 represent examples of such webs. Usually such webs are made from a thermoplastic material containing a blowing agent. During a film blowing process, the blowing agent creates open cells which are further enlarged by stretching the film. The main deficiency of webs so formed is that it is necessary to use a blowing agent, which can pollute the atmosphere.

U.S. Pat. Nos. 4,728,698 and 4,835,047 disclosed reinforced thermoplastics in which microscopic fibers of a liquid crystal polymer (LCP), which are formed in situ in a matrix of a thermoplastic polymer, constitute the reinforcing agent. These fibers, which are less than 10 microns in diameter, are oriented predominantly in one direction. Fiber reinforced thermoplastics of this type and articles made therefrom exhibit excellent mechanical properties, such as tensile strength and modulus, in the direction of fiber orientation, but have lower strength and modulus values in the transverse or cross-direction.

DISCLOSURE OF THE INVENTION

This invention according to one aspect provides novel reinforced thermoplastic webs. The webs of this invention are open work structures comprising interconnected fibers of a reinforced thermoplastic material, with interstices between the interconnected fibers. The reinforced thermoplastic material is a polymer blend comprising a matrix of a thermoplastic base polymer and microscopic reinforcing fibers of a liquid crystal polymer which is incompatible with the base polymer. These fibers of liquid crystal (LCP) are formed in situ in said matrix of base polymer.

This invention according to a broader aspect provides an open work web as described above, wherein the web is made of a thermoplastic material which is a polymer blend of two or more polymers including at least one thermoplastic polymer and optionally one or more thermotropic liquid crystal polymers, the polymers in said blend being melt processable and having overlapping melt processing temperature ranges.

This invention according to another aspect provides processes for preparing webs as above described. These webs are prepared by continuously extruding a long continuous web of a polymer blend of the desired thermoplastic material and the desired liquid crystal polymer, and subjecting the long continuous web to stretching or drawing at an extension ratio (sometimes known as "stretch ratio" or "draw ratio") such that the long continuous web is transformed into an open work web of reinforced thermoplastic material comprising interconnected visible fibers of said reinforced thermoplastic material with interstices between said interconnected fibers, wherein said reinforced thermoplastic material is a polymer blend of a thermoplastic base of matrix polymer and microscopic LCP fibers in said matrix, as described hereinbefore and hereinafter.

The present process offers at least two advantages over the prior art. First, webs are formed without use of a blowing agent. Second, webs are self-reinforced due to the presence of high performance microscopic fibers of a thermotropic LCP.

BRIEF DESCRIPTION OF THE DRAWINGS

This invention will now be described in further detail with reference to the accompanying drawings, in which:

FIG. 2 is a schematic representation of the process and apparatus for obtaining webs according to this invention.

FIG. 3 is a front elevational view of a preferred sheet-forming die for use in forming webs according to this invention.

FIG. 3A is a bottom plan view of the die shown in FIG. 3.

FIG. 4 is a schematic elevational view of LCP fiber-reinforced thermoplastic material of which the webs of the present invention are formed.

BEST MODE FOR CARRYING OUT THE INVENTION

This invention will now be described with particular reference to the best mode and preferred embodiment thereof.

Figure 1A:
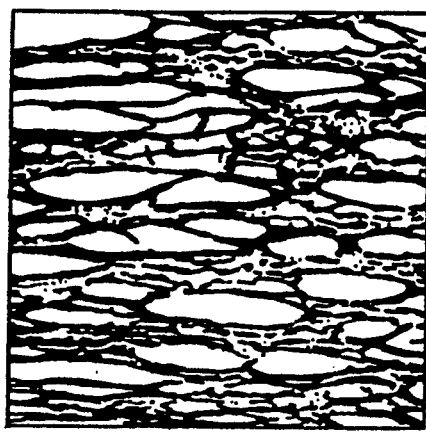
FIGS. 1A through 1D are schematic elevational views of webs according to this invention, attained at various extension ratios.
Figure 1B:
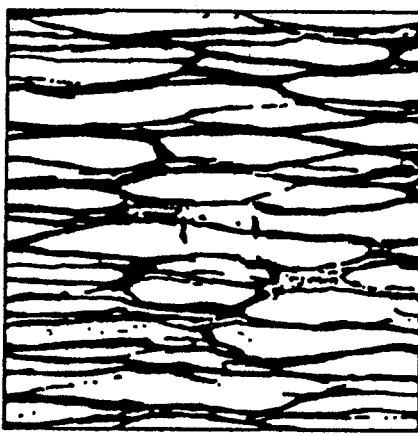
Figure 1C:
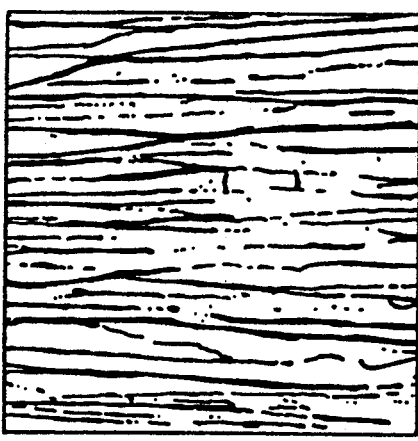
Figure 1D:

FIGS. 1A, 1B and 1C illustrate elevational views of open webs according to this invention and obtained at various extension ratios. FIG. 1D represents an open web obtained at an extension ratio which is above suitable limits, and is shown for comparison.

Referring now FIG. 1A, 10A is an open work web of self-reinforced thermoplastic material, comprising interconnected fibers 12A of reinforced thermoplastic material, with interstices 14A between the interconnected fibers 12A.

FIG. 4 illustrates schematically a fiber 12A. Fiber 12A consists essentially of a plurality of long microscopic fibers 20 of a liquid crystal polymer in a matrix 22 of thermoplastic base polymer. Fibers 20 are essentially unidirectionally oriented. The diameters of fibers 20 are predominantly from 1 to 10 microns. The lengths of fibers 20 may vary.

Fibers 20 are formed in situ in a matrix 22 of thermoplastic polymer in the course of forming web 10A, as will be hereinafter described.

FIGS. 1A through 1D represent webs obtained at progressively increasing extension ratios (sometimes known as "stretch ratio" or "draw ratio") from 5.7 to 10.7. These webs are made from a polymer blend of 20 percent by weight of polyetherimide and 80 percent by weight of a thermotropic liquid crystal polymer (LCP) supplied by Celanese Research Co., Summit, N.J., under the designation "Vectra" A950. This polymer has a melting point of 275 deg. c. and is believed to consist of about 25-27 mole percent of 6-oxy-2-naphthoyl moieties and 73-75 mole percent of p-oxybenzoyl moieties. Processing conditions are given in detail in the examples.

The web 10A shown in FIG. 1A was obtained at an extension ratio of 5.7 and under processing conditions to be explained in detail in Example 1. The web structure in this embodiment is characterized by relatively thick regions at the interconnecting portions of the fibers 12A on the web network. Also, interstices or holes 14A are generally oval configuration, albeit of widely varying size and varying length to width ratios. Most interstices are less than one inch in length. Interstices 14A in this embodiment are relatively shorter and wider than those in embodiments shown in FIGS. 1B and 1C.

FIG. 1B illustrates a web 10B, formed at an extension ratio of 7.3 (slightly higher than that used to form web 10A in FIG. 1A). Other processing conditions, which are given in detail in Example 2, are basically similar to those used for formation of web 10A in FIG. 1A, except that the die extrusion temperature was slightly lower. Fibers 12B are thinner at the interconnecting regions than their counterparts 12A in FIG. 1A, and the interstices 14B are somewhat longer and thinner as a whole than their counterparts 14A. Fibers 12B consist essentially of microscopic LCP fibers 20 in a thermoplastic polymer matrix 22A as shown in FIG. 4.

FIG. 1C shows a web 10C according to a third embodiment, comprising interconnected fibers 12C and interstices 14C. This web is obtained at an extension ratio of 8.7. Other processing details are given in Example 3. Fibers 12C are somewhat thinner at the interconnecting regions than their counterparts 12B, and interstices 14C are appreciably longer and thinner than interstices 14B.

FIG. 1D, included for comparison purposes, shows a web 10D which is formed at an extension ratio of 10.7, which is too high for the processing conditions used. Web 10D comprises an open network of fine fibers which include generally longitudinally extending fibers 12D and generally transversely extending fibers (i.e., cross-fibers) 13D joined together to form an interconnected network, with large interstices or holes 14D between fibers. The processing conditions under which web 14D was formed are explained in detail in example 4. This web is not suitable as a structural material because of the thinness of fibers 12D and 13D and the large size of holes 14D.

The starting materials for preparing the novel webs of this invention are a thermoplastic matrix (or base) polymer and (optionally) a liquid crystal polymer (LCP). An LCP herein is in accordance with the art-recognized definition, i.e., a polymer which is anisotropic even in the liquid phase. At least two thermoplastic polymers are used when no LCP is used. The starting material in all cases is a polymer blend comprising two or more polymers, at least one of which is a thermoplastic flexible chain polymer.

The thermoplastic matrix polymer is a flexible chain polymer, i.e., one in which successive units of the polymer chain are free to rotate with respect to each other, so that the polymer chain can assume a random shape. The matrix polymer is either amorphous or semi-crystalline. Suitable matrix polymers for this invention include conventional thermoplastic material such as polyethylene, polypropylene, ethylene-propylene copolymers, polystyrene and styrene co-polymers, polyvinyl chloride (PVC), polyamide (nylon), polyesters such as polyethylene terephthalate, polyether etherketone (PEEK), polyphenylene sulfide, polyetherimide, polybutylene terephthalate, and polycarbonate. Of particular interest are the socalled engineering plastics (or high performance polymers), which are characterized by high temperature resistance and good mechanical properties. These include, for example, PEEK, polyetherimide, and polyphenylene sulfide.

The liquid crystal polymer (LCP) is a polymer which exhibits anisotropy (i.e., "crystallinity") in the liquid phase. The liquid crystal polymers used in this invention are thermotropic, (i.e., they have a melting point and are melt processable).

All polymers forming the polymer blend must have an overlapping melt processing temperature range. When the starting materials are a thermoplastic flexible chain polymer and an LCP as the reinforcing polymer, the base polymer and the LCP must have an overlapping melt processing temperature range.

An especially preferred class of thermotropic liquid crystal polymer starting materials are the wholly aromatic co-polyesters such as those described in U.S. Pat. Nos. 3,991,014; 4,067,852; 4,083,829; 4,130,545; 4,161,470; 4,318,842; and 4,468,364.

The LCP must be incompatible with the matrix polymer. That is, addition of the LCP to the base polymer has little or no effect on the glass transition temperature (Tg) or the melting point of the base polymer. For purposes of this invention, all thermoplastic polymers are classified either as amorphous or semi-crystalline, since as far as the inventor is aware no thermoplastic polymer is completely crystalline. Thus, the polymers which are referred to as "crystalline" in the published literature would be classified as semi-crystalline herein.

One series of particularly suitable polymer composites according to the present invention are those made from polyetherimide (PEI) as the matrix polymer and a wholly aromatic co-polyester thermotropic liquid crystal polymer having a melting point of about 275° C. and supplied by Celanese Research Company, Summit, N.J., under the designation "Vectra A 950". This polymer is believe to consist essentially of about 25-27 percent of 6-oxy-2-naphthoyl moieties and about 73-75 percent of p-oxybenzoyl moieties, as described in example 4 of U.S. Pat. No. 4,468,364 and in G. W. Calundann, et al. "Anisotropic Polymers, Their Synthesis and Properties", reprinted from Proceedings of the Robert A. Welch Conferences on Chemical Research, XXVI Synthetic Polymers, November 15-17, 1982, Houston, Tex., pp. 247-291 (see especially pp. 263-265). Another wholly aromatic copolyester LCP consists of p-oxybenzoyl moieties and oxybiphenylene terephthaloyl moieties, and is available commercially under the tradename "Xydar" from Amoco Company, Chicago, Ill.

Another series of particular suitable composites according to this invention are those made from PEEK as the base polymer and the aforesaid "Xydar" as the liquid crystal polymer.

The amount of liquid crystal polymer in a web of this invention is preferably from about 40 to about 95 percent by weight of LCP, preferably about 50 to about 90 percent of LCP, balance essentially thermoplastic matrix polymer. Within this weight range, the LCP can be formed in situ into fibers in a matrix of the thermoplastic base polymer, under processing conditions which will be described below. Also, composites within this composition range have outstanding mechanical properties. While the desired range of LCP content may vary depending on the particular base polymer and the particular LCP selected, the indicated range of 40-95 percent by weight of LCP is suitable with the preferred thermotropic co-polyester LCP's and the preferred high performance or engineering thermoplastic base materials, such as PEI.

Additional materials are not required but may be present. Thus, it is within the scope of the invention to include an additional reinforcing fiber, such as glass, carbon or aramid, in addition to the liquid crystal polymer. The additional reinforcing fiber may be incorporated into either the base polymer or the liquid crystal polymer. The additional reinforcement provided by the additional fiber is not necessary in most cases, but where a very high stiffness (or very high strength) reinforced polymer is desired, such can be attained according to the present invention without the high loadings of conventional reinforcing fiber required in presently known reinforced polymers.

Other additives, such as pigments and fillers, coupling agents, flame retardants, lubricants, mold release agents, plasticizers and ultraviolet stabilizers, may be mixed with the base polymer and liquid crystal polymer as desired. The use of such additives is well known in the polymer processing art.

The preferred process for making webs composites of this invention will now be described with particular reference to FIGS. 2 through 5 of the drawings.

The matrix polymer and the liquid crystal polymer are mixed at a temperature at which both are processable by suitable means which will assure thorough mixing of the two polymers. Any additional ingredients which are desired in the final product are also mixed in at this time. The mixing apparatus 30 may comprise, for example, an extruder followed by a static mixer. This extruder may be either a single screw extruder or a twin screw extruder. A particularly suitable extruder 30 for the practice of this invention is a Killion one inch single screw extruder, sold by Killion Extruders, Inc. of Riviera Beach, Fla. Other suitable extruders (disclosed in U.S. Pat. Nos. 4,728,698 and 4,835,047) include a ZFK 30 twin screw extruder, sold by Werner & Pfleiderer Corp. of Ramsey, N.J. When a single screw extruder is used, the extruder may be followed by a static mixture (not shown such as a 6-element Koch Model No. KMB-150 static mixer, made and sold by Koch Industries. In any case, the extruder (and the static mixture when used) must be provided with a heating jacket, preferably one which permits zoned heating, so that the matrix polymer and the LCP may be heated from ambient temperature to processing temperature.

The base polymer, liquid crystal polymer (when used), and any additional ingredients are fed in solid form to the mixing apparatus such as extruder 30. The polymers are conveniently fed in the form of pellets. These pellets may be either a mixture of each polymer in pellets in pure form, or polymer blend pellets.

The processing temperature in extruder 30 is a temperature at which both (or all) polymers are melt processable. This is a temperature above the glass transition temperature or melting point, as the case may be, of the matrix polymer and above the melting point of the LCP.

The melt blend of and base polymer (or two or more thermoplastic flexible chain polymers) is passed from the extruder 30 to a sheet forming die 32, shown herein as a "coat hanger" die, where it is subjected to high deformation conditions resulting in fiber formation in situ.

Die 32, shown in detail in FIG. 3 and 3A, comprises an inlet 42, a housing 44, which surrounds a cavity 46, and a discharge slit 48 along its lower edge. Discharge slit 48 is long and narrow and preferably adjustable. The polymer blend as it exits from die 32 is in the form of a thin sheet and its dimensions are essentially the same as the dimensions of the slit 48. This thin sheet is passed successively over a first roll 34 and a second roll 36, both of which may be either stationary rolls or rotatable idler rolls. Then the sheet passes through the nip of a pair of rolls 38, which consist of a pair of closely spaced motor driven counter rotating rolls having a predetermined clearance therebetween. Rolls 38 are driven at a faster speed than that of the sheet emerging from die 32, so that stretching or drawing of the continuous sheet of polymer blend takes place. This stretching or drawing results in formation of an open work web structure such as those shown in FIGS. 1 through 1D.

The extension ratio (also known as "stretch ratio" or "draw ratio") in the process herein is the ratio of the driven speed of rolls 38 to that of the sheet emerging from die 32. An extension ratio according to this invention should be above about 5.

Finally, the open work web is wound up on a motor driven wind-up roll 40.

Open work webs such as 10A, 10B and 10C illustrated herein are formed in accordance with the present invention when a critical extension ratio, which is the speed ratio of take-up rolls 38 to the speed of the sheet emerging from die 32, is exceeded. The critical extension ratio varies in accordance with the composition of the polymer blend being processed and with the processing conditions used. The processing conditions which particularly affect the critical extension ratio are the processing temperature in extruder 30 and the extrusion or web formation temperature in die 32. When the processing temperature in extruder 30 and die 32 is close to 300 deg., extension ratios above about 5 give an open work web comprising interconnected fibers with interstices therebetween according to this invention, while extension ratios below this value give a web 50 which remains continuous as it is wound up on wind-up roll 40, and which can be further compressed to form a composite laminate or other shaped structure as more particularly described and claimed in the co-pending U.S. Patent Application of Avraam Isayev, Ser. No. 392,122 filed of even date herewith and entitled Self Reinforced Thermoplastic Composite Laminate.

The reinforced thermoplastic material (i.e., polymer blend) of which the open work webs of the present invention is made are generally similar in composition to the products of U.S. Pat. Nos. 4,728,698 and 4,835,047, both cited supra. In general, an even higher degree of uniformity of direction of fiber orientation is achieved in the products and processes of this invention than in the products and processes of the aforesaid earlier patents.

The products of this invention are suitable for various purposes, particularly where strong materials having a net-like configuration are required. A major application of the products and processes of this invention is in the packaging industry. Products of this invention can also be used as fishing nets and as nets for other purposes where it is necessary to support a heavy load. The high impact strength in a direction transverse to the web is also useful in various applications, including fishing nets where a live fish may strike the net with some force.

It is possible to prepare products of this invention in any desired width. Where a desired width exceeds a convenient width for casting of a sheet or web 50, it is possible to fuse the edges of two or more webs 10A (or 10B or 10C) herein and to join the two webs together along their respective fused edges. The thermoplastic nature of the base polymer makes this possible. This enables one to form a net of any desired width.

Webs of this invention can also be fused for reinforcement of a second thermoplastic polymer, which may be either the same as or different from the thermoplastic polymer used as the base polymer in forming the web. Conventional encapsulation techniques can be used for this purpose.

Webs of this invention can be tailormade for a desired end application by controlling the density of the web. This can be done by controlling the extension ratio, the processing temperatures and other processing conditions.

The simplicity of the present process and the absence of blowing agents to achieve webs are novel features of this invention which lead to strong products and low cost operation. Thermoplastic webs are conventionally made at present by incorporating a blowing agent into the matrix of the thermoplastic material. The present process also makes possible greater control of the dimensions of the web than is possible where blowing agents are used.

This invention will now be described in further detail with reference to the the examples which follow.

EXAMPLE 1

This example describes the formation of a web 10A as shown in FIG. 1A.

Pellets of a blend of polyetherimide (PEI) and a liquid crystal polymer (LCP) was continuously fed to the inlet of a mixing apparatus 30. The PEI/LCP weight ratio was 20/80 and was prepared according to U.S. Pat. No. 4,835,047.

The PEI was obtained from General Electric Co., Schenectady, N.Y., under the tradename "Ultem" 1000. This material has a glass transition temperature of 215° C.

The LCP was "Vectra" A950, obtained from Celanese Research Corp., Summit, N.J. This polymer has a melting point of 275 deg. c. and is believed to consist essentially of about 25-27 mole percent of 6-oxy-2-naphthoyl moieties and 73-75 mole percent of p-oxybenzoyl moieties.

The extruder 30 is a Killion single screw extruder having a one inch barrel diameter and a screw L/D ratio of 24, driven by a one horsepower motor, and having three heating zones in series (zone 1 being near the feeder) and also having a variable speed screw (to control feed rate).

The output of the extruder was continuously fed to a heated coathanger die 32, having an extrusion slit 15 cm. wide and (as set for this experiment) 1.5 mm. thick. (The thickness of the extrusion slit 48 in coathanger die 32 is adjustable from 1 to 2 mm.).

The continuous sheet extruded from die 32 passed over the apparatus for this example further comprised two stationary rolls 34, and 36, then through the nip two counter-rotating motor driven rolls 38 having an adjustable opening (set at 0.68 mm.) therebetween, and finally was wound up a motor driven wind-up roll 40.

Operating conditions are shown in Table I below. It will be noted that the extension ratio, which is the ratio of the linear speed of nip rolls 38 to that of the sheet emerging from die 32,is 5.7. The web, which is cast as a continuous sheet, is transformed into an open network of interconnected fibers during processing. This open work web has the appearance shown in FIG. 1A.

TABLE I

| Example No. | 1 | 2 | 3 | 4 |
|---|---|---|---|---|
| Extruder Temp.,°C. | | | | |
| Zone 1 | 287 | 287 | 287 | 287 |
| Zone 2 | 300 | 300 | 300 | 300 |
| Zone 3 | 300 | 300 | 300 | 300 |
| Heaters between extruder and die, °C. | | | | |
| Heater 1 | 305 | 305 | 305 | 305 |
| Heater 2 | 310 | 310 | 310 | 310 |
| Screw RPM | 20.8 | 20.8 | 20.8 | 20.8 |
| Current, amp | 5 | 5 | 5 | 5 |
| Die temp., °C. | 300 | 292 | 292 | 292 |
| Take-up speed, in./min. | 17 | 22 | 26 | 36 |
| Extension ratio | 5.7 | 7.3 | 8.7 | 10.7 |

EXAMPLE 2

The procedure of Example 1 is followed with an increase in take-up speed and hence, an extension ratio, and a decrease in die temperature, both as given in Table I above. A web having the appearance shown in FIG. 1B is formed.

EXAMPLE 3

Example 1 is repeated except that the die temperature and take-up speed are as shown in Table I above. Conditions other than take-up speed are the same as in Example 2. Take-up speed is faster, and hence extension ratio is greater, than in Example 2.

Comparison of the webs obtained in Examples 1, 2 and 3 shows that the fibers forming the webs become progressively thinner and the interstices progressively longer and proportionately narrower as take-up speed and therefor extension ratio are increased within the limits of these examples while other variables remain substantially unchanged.

EXAMPLE 4

This example, included for comparison, shows that a very fine web structure is obtained when take-up speed is increased to 32 inches per minute and the extension ratio correspondingly increased to a value of 10.7. Operating conditions are shown in Table I. The resulting net is shown in FIG. 1D.

While the present invention has been described with respect to specific embodiments thereof, it shall be understood that the invention is not limited thereto or thereby and that modifications can be made without departing from the scope of this invention. Accordingly, this invention shall be as set forth in the appended Claims.

What is claimed is:

1. An open work web of reinforced thermoplastic material comprising interconnected fibers of said reinforced thermoplastic material with interstices between said interconnected fibers, said reinforced thermoplastic material being a polymer blend comprising microscopic reinforcing fibers of a liquid crystal polymer, in a matrix of a thermoplastic base polymer, said fibers of liquid crystal polymer being formed situ in said matrix of base polymer.

2. An open work web according to claim 1 in which said microscopic fibers are essentially unidirectionally oriented.

3. An open work web according to claim 1 in which said base polymer is a flexible chain polymer.

4. An open work web according to claim 1 in which said liquid crystal polymer is a thermotropic liquid crystal polymer.

5. An open work web according to claim 1 in which the base polymer and the liquid crystal polymer are incompatible.

6. An open work web according to claim 4 in which said liquid crystal polymer is a wholly aromatic copolyester.

7. An open work web according to claim 1 in which said web is formed in the absence of a blowing agent.

8. An open work web of thermoplastic material comprising interconnected fibers of said thermoplastic material with interstices between said interconnected fibers, said thermoplastic material being a polymer blend comprising at least one thermoplastic flexible chain polymer and one or more thermotropic liquid crystal polymers, the polymers in said blend being melt processable and having overlapping melt processing temperature ranges.

9. An open work web according to claim 8 in which said polymer blend comprises at least two flexible chain thermoplastic polymers.

10. An open work web according to claim 8, said web being formed in the absence of a blowing agent.

* * * * *